March 14, 1967      H. J. BURKE      3,308,906
LIFETIME LUBRICATED BALL JOINT
Filed June 15, 1964
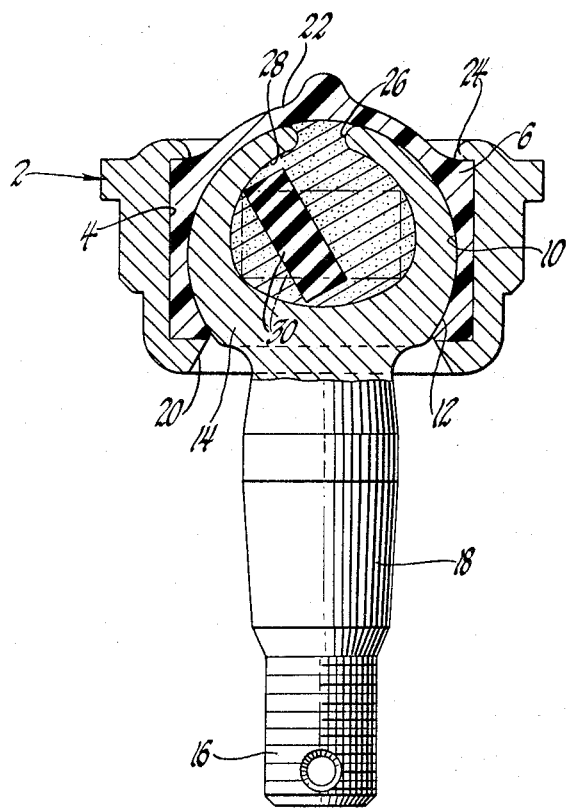
INVENTOR.
Harold J. Burke
BY
W. J. Wagner
ATTORNEY United States Patent Office 3,308,906
Patented Mar. 14, 1967

3,308,906
LIFETIME LUBRICATED BALL JOINT
Harold J. Burke, Saginaw, Mich., assignor to General Motors Corporation, Detroit, Mich., a corporation of Delaware
Filed June 15, 1964, Ser. No. 375,027
6 Claims. (Cl. 184—1)

This invention relates to swivel joints and more particularly to ball joint assemblies of the type which are provided with an initial lubricant charge sufficient for the normal service life of the joint.

In recent years, manufacturers of ball and other types of swivel joints have exerted concerted effort to eliminate the need for periodic service lubrication. One of the more obvious expedients employed is to provide a joint including a lubricant reservoir of sufficient size to receive a lubricant charge calculated to last throughout the service life of the joint. However, in practice, the mere provision of sufficient lubricant to satisfy the normal lubrication requirements of a joint proves to be unsatisfactory in the absence of reliable means for positively metering the flow of lubricant from the reservoir. The present invention is concerned primarily with providing positive displacement of lubricant by means displaying linearly progressive expansion characteristics.

An object of the invention is to provide an improved ball joint assembly.

A further object is to provide a joint assembly having a lifetime charge of lubricant which is metered to the bearing surfaces at a predetermined controlled rate.

Another object is to provide a ball joint assembly in which displacement of lubricant medium from a reservoir is accomplished as a function of progressive swell of an elastomer pellet or slug.

Still another object is to provide a ball joint assembly of the general type described in which the lubricant reservoir is formed interiorly of the ball and exit therefrom is directionally oriented so that lubricant metering occurs primarily as a result of elastomer swell induced by chemical reaction with the lubricant, rather than by gravity feed.

These and other objects, advantages and features of the invention will become more readily apparent as reference is had to the accompanying specification and drawing wherein the single figure of the drawing illustrates a ball joint assembly incorporating the invention.

Referring now to the drawing, reference numeral 2 generally designates a socket adapted for mounting in a wheel suspension element, not shown. Socket 2 is formed with a cylindrical inner wall 4 in which is disposed a plastic bearing element 6. Element 6 is preformed to provide a parti-spherical inner bearing surface 10 arranged in bearing engagement with the outer parti-spherical bearing surface 12 formed on the head portion 14 of a ball stud element 16. The stem portion 18 of stud element 16 extends through an aperture 20 formed in the bottom wall of socket 2, while the upper end of head 14 is sealed by portion 22 of the plastic bearing element 6. An inturned lip 24 on socket 2 engages the peripheral edge of portion 22 to retain element 6 in the socket.

In accordance with one feature of the invention, the head portion 14 of ball stud 16 is in the form of a generally spherical hollow ball having an opening 26 formed at the upper end thereof. The hollow interior or cavity 28 of head portion 14 forms a reservoir adapted to receive a charge of lubricant sufficient to maintain an adequate lubricant film between the bearing surfaces 10 and 12 throughout the normal service life of the joint.

According to the principal feature of the invention, prior to charging the cavity 28 of head portion 14 with the lubricant, an elastomeric pellet 30 is introduced therein. Pellet 30 preferably occupies approximately one-quarter of the volume of cavity 28, the remainder of which is thereafter filled with the lubricant prior to final assembly of the joint. In operation, pellet 30 gradually expands during the normal service life of the joint to provide a slow metered flow of lubricant from cavity 28 to the space between the bearing surfaces 10 and 12 at a rate calculated to accomplish replacement of normal lubricant losses occasioned by impact, normal leakage, etc.

While a variety of elastomers, both natural and synthetic, exhibit the characteristic of progressive swelling when placed in a lubricant or other hydrocarbon medium, the particular elastomer selected for a particular case will, of course, depend upon specific variables, such as normal service life, type of duty, loads, temperature environment, etc., which are necessarily determined by the application involved. However, by way of example, in the illustrated embodiment of an automotive suspension ball joint assembly, it has been found that suitable linear progression characteristics and approximate rate of swell is achieved by utilization of the class of chloroprene synthetics known commercially as Neoprene-W.

While but one embodiment of the invention has been shown and described, it will be evident that numerous modifications and variations may be made therein, particularly with respect to elastomer formulations. It is, therefore, to be understood that it is not intended to limit the invention to the single embodiment shown, but only by the scope of the claims which follow.

I claim:
1. A ball joint assembly comprising, an apertured socket, a stud extending through the aperture, a head portion formed on said stud having an outer surface in bearing engagement with the inner surface of said socket, means forming a lubricant reservoir in said head portion, and solid pellet means in said reservoir operable responsive to a chemical reaction to slowly expand and displace lubricant therefrom at a rate sufficient to assure maintenance of a film of lubricant between said bearing surfaces.

2. A ball joint assembly comprising, an apertured socket, a stud extending through the aperture, a head portion formed on said stud having an outer surface in bearing engagement with the inner surface of said socket, means forming a lubricant reservoir in said head portion, and elastomer means in said reservoir of the type which progressively expands in the presence of lubricant in response to a chemical reaction to displace lubricant from the reservoir into the space between said bearing surfaces.

3. A ball joint assembly comprising, an apertured socket having a parti-spherical inner bearing surface, a stud extending through the aperture, a head portion formed on said stud having an outer parti-spherical bearing surface in engagement with the inner surface of said socket, means forming a lubricant reservoir in said head portion, and expandable means in said reservoir operable responsive to chemical reaction with said lubricant to gradually displace the latter from said reservoir into the space between said bearing surfaces.

4. A ball joint assembly comprising, an apertured parti-spherical socket, a stud extending through the aperture, parti-spherical head portion formed on said stud having an outer surface in bearing engagement with the inner surface of said socket, means forming a lubricant reservoir in said head portion, and an expandable elastomer in said reservoir operable responsive to chemical reaction with said lubricant to gradually displace the latter from said reservoir into the space between said bearing surfaces.

5. A ball joint assembly comprising, an apertured parti-spherical socket, a stud extending through the aperture, a hollow parti-spherical head portion formed on said stud having an outer surface in bearing engagement with the inner surface of said socket, a hydrocarbon sensitive solid elastomer disposed in the hollow of said head portion initially occupying less than half the volume thereof, and hydrocarbon lubricant means disposed in the remainder of said volume, said elastomer being capable of expanding sufficiently to totally occupy the entire volume responsive to prolonged exposure to said lubricant due to a chemical reaction.

6. The structure set forth in claim 4 wherein said elastomer comprises a member of the chloroprene family.

References Cited by the Examiner

UNITED STATES PATENTS 1,686,872    10/1928    Miller.
2,439,053    4/1948    Moore _____ 184—30

LAVERNE D. GEIGER, *Primary Examiner.*

H. S. BELL, *Assistant Examiner.*